Dec. 2, 1952  E. P. PIERCE  2,619,928
APPLIANCE FOR USE IN WELDING
Filed March 26, 1945  2 SHEETS—SHEET 1
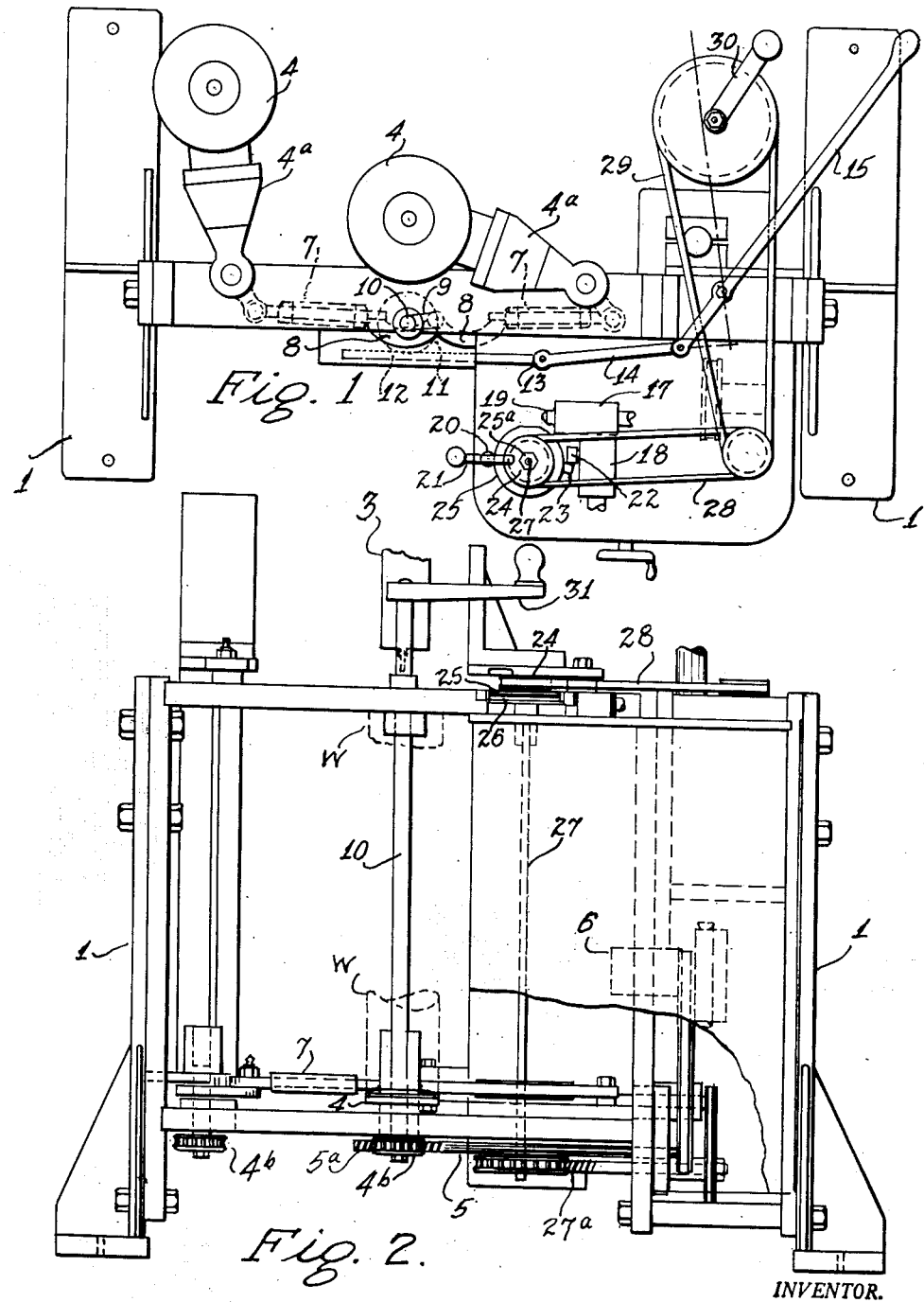
INVENTOR.
ERNEST P. PIERCE
BY
Milburn & Milburn
Attorneys Dec. 2, 1952 E. P. PIERCE 2,619,928
APPLIANCE FOR USE IN WELDING
Filed March 26, 1945 2 SHEETS—SHEET 2

INVENTOR.
ERNEST P. PIERCE
BY
Milburn & Milburn
Attorneys

Patented Dec. 2, 1952

2,619,928

UNITED STATES PATENT OFFICE 2,619,928

APPLIANCE FOR USE IN WELDING

Ernest P. Pierce, Cleveland, Ohio, assignor to John R. Milburn, Cleveland, Ohio

Application March 26, 1945, Serial No. 584,746

3 Claims. (Cl. 113—59)

This invention relates to an improved device for placing a plurality of shells, casings or the like successively in position for welding a closure in the end thereof.

One object of this invention is to provide such a device that will facilitate the removal of one shell or casing after the welding operation has been performed and the replacement of the same by another shell or casing to be welded, whereby the speed of such manipulations may be greatly increased.

More specifically, one object is to provide such a device with means for removing one piece of work that has been welded and simultaneously replacing it with another piece of work.

Another object is to provide such a device with an auxiliary means of adjustment for originally setting the mechanism so as to ensure proper positioning of the work-holding means with respect to the operating means therefor.

Another object is to provide such a device with means for automatically timing the welding operation and with convenient means for adjusting and controlling the same.

A further object is to so design such an appliance that the means for setting the mechanism for timing the welding operation and the means for manipulating the work-positioning mechanism may be actuated by the operator from the same position.

Other objects will appear from the following description and claims when considered together with the accompanying drawings.

Fig. 1 is a top plan view of my device;

Fig. 2 is an elevation thereof;

Figure 3:
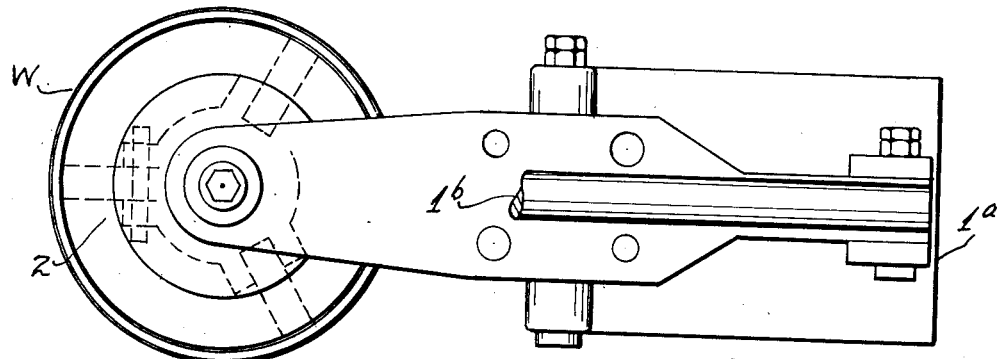
Fig. 3 is a top plan view of a part of the device.
Figure 4:
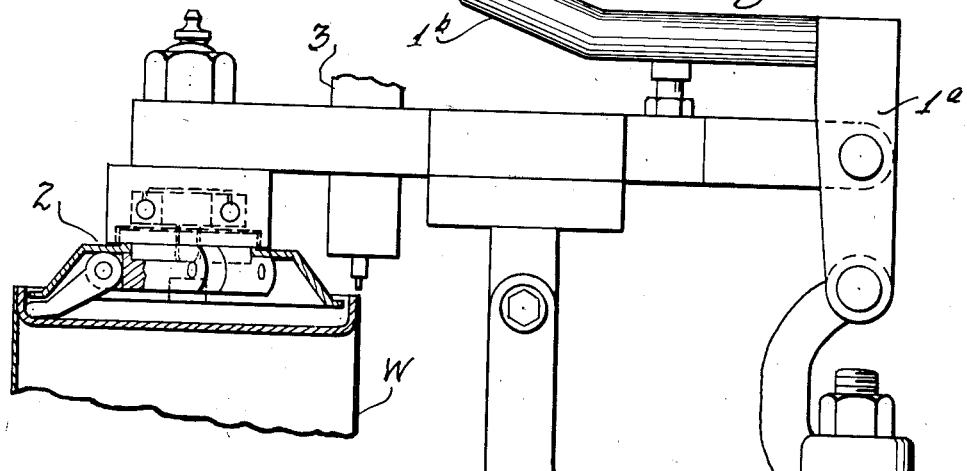
Fig. 4 is a view showing the welding head for the shell or casing and is partly in vertical section and partly in elevation.

It is to be understood that the present disclosure is merely for the purpose of illustration and that there might be devised various modifications thereof without departing from the spirit of my invention as herein set forth and claimed.

The frame 1 is provided with a suitable arm 1a for supporting the welding head 2 of a conventional form of mechanism in proper position for the welding operation and it is provided also with suitable supporting means 1b for the means 3 for supplying the welding ribbon to the point of the welding operation, in the same manner as is already well known in the art.

In the present device, the shells, casings or other such pieces of work W are intended to be placed upon the work-holders 4 which are moved laterally into operative position with respect to the welding means. Each work-holder 4 is rotatably mounted upon an arm 4a which is pivotally mounted upon the frame 1; and the bottom end of each work-holder is provided with a worm gear 4b to be brought into meshing engagement with the worm 5a on a rotatable drive shaft 5 in the frame. The shaft 5 is operated by an electric motor 6 through suitable connections and with suitable means of control.

An adjustable connecting rod 7 extends between the end of arm 4a, in each instance, and the one end of the curved locking link 8, with pivotal connections at its two ends. Both of the links 8 are pivotally connected to the end of the radially extending crank arm 9 fixed upon the upright shaft 10. The shaft 10 is mounted at top and bottom in the frame for rotatable movement by means of the pinion 11 thereon which has operative engagement with the rack 12 for actuation thereby.

The rack 12 has pivotal connection at the point 13 with the intermediate lever link 14 which in turn has pivotal connection with the one end of the operating lever arm 15 mounted upon the frame. The free end of lever arm 15 is readily accessible to the operator for manipulation from the same side of the machine where the work-holders 4 are located; so that these operations can be performed conveniently by the operator while he occupies the same position.

The pivotal point 13 is so arranged that it will not come to dead centre.

These parts are so constructed and arranged that manipulation of the lever arm 15 in one direction will bring the worm gear 4b of one work-holder into mesh with the worm 5a and at the same time will move the worm gear of the other work-holder out of mesh with the worm and into convenient position for removal of the piece of work therefrom and positioning of another piece of work thereupon preparatory to the return of this work-holder to operative position for welding. Thus the two work-holders, as here shown, can be moved conveniently and quickly and alternately into and out of operative engagement with the drive shaft for rotation of the work during the welding operation and replacement of the work, when finished, by other work to be welded.

Frictional engagement of the bottom end portion of the piece of work with the central raised portion of the work-holder is sufficient to hold the same in position for the welding operation thereupon, and it can be readily placed thereupon and removed therefrom.

As each piece of work is moved into welding position, it will make effective electric contact with the fingers 16 for grounding the electric circuit during the welding operation so as to prevent the circuit from otherwise going through the bearings of the mechanism, as will be understood.

The electric circuit for the welding operation is controlled by switches in the boxes 17 and 18, which are of conventional form. The starting switch in box 17 is actuated by engagement of the button 19 by the projection 20 depending from the rotating handle 21 by which this part of the device may be set for timing the welding operation. The switch in box 18 is actuated by the engagement of the pivoted lever arm 22 by the projection 23. The handle 21 may be attached to the pulley 24 which is rotatably adjustable with respect to the disk 25 upon which the projection 23 is provided. Such adjustment is effected by loosening the nut 25a and then tightening the same after the desired relative positions of the two projections 20 and 23 is obtained. In this way there may be obtained the desired length of time for the welding operation.

Located immediately below the disk 25 there is a frictionally engaging disk 26 which has drive connection upon the operating shaft 27 for actuating the mechanism just referred to. This frictional engagement is sufficient for transmission of driving force during operation of the welding mechanism and will yield when the projection 23 engages the lever arm so that the operating shaft 27 from the motor may continue to run.

The starting switch in box 17 may be actuated by rotation of the handle 21, after this timing means has been adjusted in the manner desired, the handle 21 being rotated in a clock-wise direction. Then the timing means will automatically rotate in the reverse direction, by means of the operating shaft 27, until the projection 23 trips the stopping switch in box 18.

The welding mechanism is so connected to the drive means that it will run more slowly than the means for rotating the work-holders, thereby ensuring that the welding operation is completely performed upon the work. Accordingly, there may be a suitable differential between the feeding rate of the welding ribbon and the peripheral speed of the work. The same motor is used to rotate the said work-holders and the welding means and there is provided suitable drive connections so as to effect the relative rates of speed as just referred to. The drive connection for the shaft 27 from the motor 6 includes the worm and worm gear combination 27a.

Instead of having to use the handle 21 at the rear of the machine, for setting the welding mechanism, I have provided the pulley 24, as above referred to, and the belt 28 which, through the intermediate pulley and belt 29, connects with the pulley and handle 30 at the front of the machine. That is, the handle 30 is located at the same side of the machine as the lever arm 15 and closely adjacent thereto so as to permit the operator to manipulate both of them from the same position in front of the machine.

By means of the crank 31 on the shaft 10, there may be effected necessary adjustment of the parts when the machine is first set up so as to ensure proper engagement of the work-holders with the operating mechanism therefor.

Assuming that the motor 6 is operating the drive shaft 5, one of the work-holders 4 with a piece of work thereon may be brought into operative welding position by manipulation of the lever arm 15 so as to mesh its worm gear with the worm 5a. This having been done, the operator will then turn the handle 30 clock-wise so as to set the welding control mechanism for starting the welding operation. The welding operation is thus initiated through the actuation of switch in box 17 and will be automatically discontinued by the actuation of the stop switch in box 18, as above explained. During this time, the handle 30 has been rotated counter-clockwise through its belt and pulley connections and must be re-set in order to again set this mechanism into operation for welding. During the welding of this piece of work, the operator has ample time to place a piece of work upon the other work-holder preparatory to moving the same into operative welding position as the finished piece of work is removed. This is accomplished by turning the lever handle 15 in the opposite direction, and the finished piece of work will be replaced by another piece of work upon its holder, and so on.

As each work-holder is placed in operative position, in the manner above explained, one of the curved links 8 will be moved into engagement about the vertical shaft 10 and thereby effect locking of these parts in such position during the welding operation.

With my device, there is ensured proper welding of the work and the speed of production is greatly increased. Also, there is provided increased convenience for the operator in attending to the several manipulations of the mechanism. My device is also capable of certain adjustments which add to the efficiency of its operation, as well as its dependability throughout a prolonged period of service.

What I claim is:

1. In a device of the class described, the combination of a stationary frame, a rotatable drive shaft in said frame, two work-holders each provided with driven means and pivotally mounted upon said frame so as to have their individual driven means movable into and out of operative engagement with said drive shaft, a single operating shaft mounted in said frame and having a crank arm thereon, individual lever connections between the crank arm of said operating shaft and each of said work-holders for simultaneously moving the driven means of one of said work-holders into engagement and the driven means of the other of said work-holders out of operative engagement with said drive shaft, and a single lever operatively connected to said operating shaft for manipulating the same.

2. In a device of the class described, the combination of a frame, a rotatable drive shaft in said frame, a plurality of rotatably mounted work-holders mounted in said frame and each provided with driven means, and means for simultaneously moving said driven means of one of said work-holders into and said driven means of another of said work-holders out of operative engagement with said drive shaft, said last-named means including interconnected duplicate jointed link mechanism each with a dead centre at the joint between the links thereof and corresponding to position of operative engagement of each of said work-holders and including a single lever for manipulating said last-named means so as to bring said link mechanism to a point beyond dead centre alternately for the said work-holders as they are moved to position of operative engagement.

3. In a device of the class described, the combination of a frame, a rotatable drive shaft in said frame, a plurality of rotatably mounted work-holders mounted in said frame and each provided with driven means, and means for simultaneously moving said driven means of one of said work-holders into and said driven means of another of said work-holders out of operative engagement with said drive shaft, said last-named means including a link pivotally connected to each of said work-holders and a single rotatable crank arm mounted in said frame and pivotally connected to the ends of said links for movement past dead centre in each instance at a point corresponding to position of operative engagement of each of said work-holders and including a single lever for manipulating said means so as to bring said crank and link connections to a point beyond dead centre alternately for said work-holders as they are moved to position of operative engagement.

ERNEST P. PIERCE.

REFERENCES CITED

The following references are of record in the file of this patent:

UNITED STATES PATENTS

| Number | Name | Date |
|---|---|---|
| 1,161,545 | Starr | Nov. 23, 1915 |
| 1,645,049 | Harford | Oct. 11, 1927 |
| 1,662,045 | Patterson | Mar. 6, 1928 |
| 1,751,077 | D'Ardenne et al. | Mar. 18, 1930 |
| 1,838,899 | Arnold | Dec. 29, 1931 |
| 2,038,525 | Cate | Apr. 28, 1936 |
| 2,238,056 | Hothersall | Apr. 15, 1941 |
| 2,263,288 | Burrows | Nov. 18, 1941 |
| 2,277,128 | Miller | Mar. 24, 1942 |
| 2,283,140 | Johnston | May 12, 1942 |
| 2,289,510 | Marceau | July 14, 1942 |
| 2,394,467 | Muller | Feb. 5, 1946 |
| 2,488,126 | Kahle | Nov. 15, 1949 |

FOREIGN PATENTS

| Number | Country | Date |
|---|---|---|
| 382,902 | Germany | Oct. 8, 1923 |